United States Patent
Dhawan et al.

(10) Patent No.: US 12,223,066 B2
(45) Date of Patent: Feb. 11, 2025

(54) DATA SECURITY IN VIRTUAL-WORLD SYSTEMS

(71) Applicant: Bank of America Corporation, Charlotte, NC (US)

(72) Inventors: Lalit Dhawan, Cranbury, NJ (US); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 294 days.

(21) Appl. No.: 17/809,743

(22) Filed: Jun. 29, 2022

(65) Prior Publication Data

US 2024/0005011 A1    Jan. 4, 2024

(51) Int. Cl.
G06F 21/60      (2013.01)

(52) U.S. Cl.
CPC .... G06F 21/604 (2013.01); *G06F 2221/2113* (2013.01)

(58) Field of Classification Search
CPC .......... G06F 21/604; G06F 2221/2133; G06F 2111/18; H04L 41/342; H04L 67/131
See application file for complete search history.

(56) References Cited

U.S. PATENT DOCUMENTS

| | | | |
|---|---|---|---|
| 8,082,297 B2 | 12/2011 | Syvain et al. | |
| 8,631,417 B1 | 1/2014 | Mendes Da Costa et al. | |
| 9,165,426 B2 | 10/2015 | Jones et al. | |
| 9,342,211 B2 | 5/2016 | Deluca et al. | |
| 10,326,667 B2 | 6/2019 | Jones et al. | |
| 10,587,584 B2 | 3/2020 | Vikramaratne et al. | |
| 10,610,787 B2 | 4/2020 | Hamilton, II et al. | |
| 10,931,650 B1 | 2/2021 | Mccown et al. | |
| 10,981,069 B2 | 4/2021 | Kawachiya et al. | |
| 11,170,003 B2 | 11/2021 | Wu et al. | |
| 2007/0254631 A1 | 11/2007 | Spooner | |
| 2009/0235191 A1* | 9/2009 | Garbow | G06F 3/04815 715/764 |
| 2010/0250383 A1 | 9/2010 | Frazier et al. | |
| 2011/0072367 A1 | 3/2011 | Bauer | |
| 2014/0026078 A1 | 1/2014 | Dawson et al. | |
| 2018/0104595 A1 | 4/2018 | Kawachiya et al. | |

(Continued)

FOREIGN PATENT DOCUMENTS

| | | |
|---|---|---|
| CN | 101496022 A | 7/2009 |
| CN | 102450032 A | 5/2012 |

(Continued)

*Primary Examiner* — Ellen Tran (57) ABSTRACT

A system includes a memory, a user device that can be used by a user to enter a virtual environment and a processor coupled to the user device and the memory. The processor is configured to receive a first user credential from the user to perform a first data interaction in the virtual environment with a second user. The processor detects that the first user and the second user are part of a first virtual community, invokes a first set of rules, and processes the first request according to the first set of rules. The processor receives a second request from the first user to perform a second data interaction in the virtual environment with a third user. The processor detects that the third user is part of a second virtual community, invokes a second set of rules, and processes the second request according to the second set of rules.

17 Claims, 4 Drawing Sheets

(56) References Cited

U.S. PATENT DOCUMENTS

| | | | |
|---|---|---|---|
| 2018/0123816 A1 | 5/2018 | Tandon et al. | |
| 2020/0338458 A1 | 10/2020 | Huang et al. | |
| 2021/0042748 A1 | 2/2021 | Sepulveda et al. | |
| 2021/0091994 A1* | 3/2021 | Meirosu | H04W 4/24 |
| 2022/0321507 A1* | 10/2022 | Skuratowicz | G06F 3/0481 |

FOREIGN PATENT DOCUMENTS

| | | |
|---|---|---|
| CN | 104468741 A | 3/2015 |
| CN | 112446450 A | 3/2021 |
| JP | 2006072952 A | 3/2006 |

* cited by examiner

DATA SECURITY IN VIRTUAL-WORLD SYSTEMS

TECHNICAL FIELD

The present disclosure relates generally to network communication, and more specifically to data security in virtual-world systems.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access to other users' information.

SUMMARY

The system and methods implemented by the system as disclosed in the present disclosure provide technical solutions to the technical problems discussed above by enforcing secure virtual data interactions in a virtual environment. The disclosed system and methods provide several practical applications and technical advantages.

For example, the disclosed system and methods provide the practical application of intelligently controlling data interactions between users in a virtual environment based on rules defined for conducting data interactions between users of the virtual environment. As described in accordance with embodiments of this disclosure, one or more rules may be defined in relation to data interactions performed between two users in the virtual environment based on a level of confidence between the two users. For example, a set of rules defined for data interactions between two friends may be relatively relaxed in terms of data security as compared to a set of rules defined for data interactions between two strangers. The idea is that familiarity between users generally translates into a higher confidence level between the users and there is less likelihood of users engaging in deceptive interaction practices with other familiar users.

A virtual-world server allows a user to create one or more virtual communities, wherein each virtual community includes a group of users that are registered to perform data interactions in the virtual environment. A virtual community may include a group of users who are either familiar to each other in some manner and/or have confidence that members of the virtual community may not engage in deceptive interaction practices with other members of the virtual community. One or more sets of rules are defined for data interactions performed in the virtual environment between two members of a virtual community, between members of two different virtual communities, between a member of a virtual community and another user who is not part of a virtual community, and between users who are part of no virtual communities. Rules defined for data interactions between members of a virtual community may be less stringent and may implement lesser data security safeguards. On the other hand, rules defined for data interactions between members of different virtual communities may be more stringent and may implement a higher level of data security safeguards. Rules defined for data interactions between strangers may have the highest levels of data security safeguards. Applying customized data security rules to virtual data interactions performed in the virtual environment significantly improves the data security of virtual data interactions performed in the virtual environment and avoids scams including theft of user data.

Thus, the disclosed system and methods provide the technical advantage of improving data security in the virtual environment. By improving data security in the virtual environment, the disclosed system and methods generally improve technology related to performing secure data interactions in the virtual environment.

Further, the disclosed system and methods provide the additional practical application of saving processing and networking resources by intelligently identifying a level of confidence between two users engaging in a virtual data interaction within the virtual environment and selectively applying data security rules to the data interaction based on the confidence level between the users. Applying data security rules to a data interaction based on a level of confidence between users engaging in the data interaction allows the system to apply more stringent types of data security measures (e.g., additional authentication and approvals) requiring additional processing and networking resources only when they are necessary. This simplifies data interactions between users having higher confidence levels and saves processing and networking resources which would otherwise be spent in implementing complicated and resource intensive data security measures. In addition, the more stringent types of data security measures typically require additional data signaling between various computing nodes of the system (e.g. for additional authentication and approvals) resulting in additional data traffic that may contribute to network congestion. By selectively applying more stringent types of data security measures to data interactions based on confidence levels between users engaging in the data interactions, the disclosed system and methods avoid applying the stringent data security measures to all data transactions. This provides an additionally technical advantage of reducing network congestion.

The disclosed system and methods provide the additional practical application of improving interoperability of real-world systems and virtual world systems (e.g., metaverse systems) so that information may be seamlessly shared between these systems to implement authorization of users, and other data interactions performed in real-world and virtual environments. For example, user information collected from the a user and/or assigned to the user in a real-world environment is used in the virtual environment (e.g., metaverse environment) to authenticate the user before allowing the user to access the virtual environment and perform any kind of action or interaction within the virtual environment.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
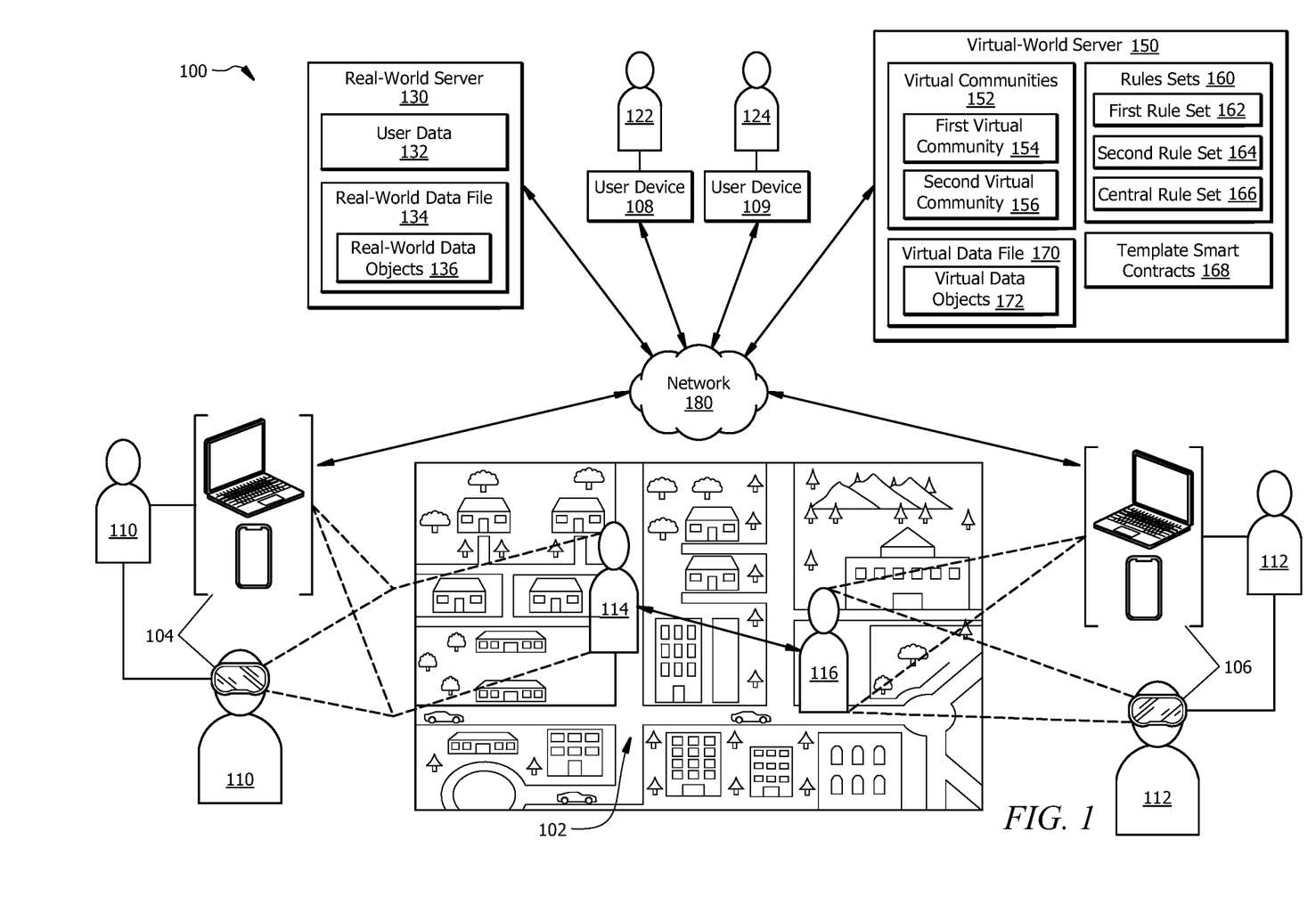
FIG. 1 is a schematic diagram of a system, in accordance with certain aspects of the present disclosure.

FIG. 1 is a schematic diagram of a system 100, in accordance with certain aspects of the present disclosure. System 100 may include a first user device 104, a second user device 106, a third user device 108, a fourth user device 109, real-world server 130, and virtual-world server 150 each connected to a network 180. A first user 110 is associated with the first user device 104, a second user 112 is associated with the second user device 106, a third user 122 is associated with the third user device 108 and a fourth user 124 is associated with the fourth user device 109. The system 100 may be communicatively coupled to the communication network 180 and may be operable to transmit data between each one of the first user device 104, second user device 106, third user device 108, fourth user device 109, real-world server 130, and virtual-world server 150 through the communication network 180.

In general, the system 100 may improve data security relating to data interactions conducted in a virtual environment 102 (e.g., a metaverse environment) by controlling data interactions between users based on customized sets of rules. The system 100 additionally improves interoperability of real-world systems and virtual world systems (e.g., metaverse systems) so that information may be seamlessly shared between these systems to implement authorization of users, and other data interactions performed in real-world and virtual environments. For example, user information collected from the first user 110 and/or assigned to the first user 110 in a real-world environment may be used in the virtual environment 102 (e.g., metaverse environment) to authenticate the first user 110 before allowing the first user 110 to access the virtual environment 102 and perform any kind of action or interaction within the virtual environment 102. This process provides improved information security because it relies on a combination of factors that are associated with both the first user 110 in the real-world and a first avatar 114 that is associated with the first user 110 in the virtual environment 102. It may be noted that the terms "real-world" and "real-world environment" in this disclosure refer to any non-virtual environment where users (e.g., users 110, 112, 122 and 124) can physically interact with real persons and objects. A real-world data interaction may refer to any data interaction performed outside the virtual environment 102 (e.g., a metaverse environment). Further, it may be noted that while certain embodiments of the present disclosure are described in the context of a metaverse environment which is an example of a virtual environment 102, the methods discussed in this disclosure apply to any other virtual environment 102. The terms "virtual environment" and "metaverse environment" are used interchangeably throughout this disclosure. Furthermore, it may be noted that while certain embodiments of this disclosure describe one or more operations in relation to the first user 110, these embodiments apply to any user (e.g., users 112, 122 and 124) connected to network 180.

The first user 110 may access the virtual environment 102 (e.g., a metaverse environment) through the first user device 104. The first user device 104 is configured to display a two-dimensional (2D) or three-dimensional (3D) representation of the virtual environment 102 to the first user 110. Similarly, second user 112 may access the virtual environment 102 using the second user device 106, third user 122 may access the virtual environment 102 using third user device 108 and fourth user 124 may access the virtual environment 102 using fourth user device 109. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 114 for the first user 110). An avatar is a graphical representation of a user at a virtual location within the virtual environment 102. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at a physical location in the real-world environment or being in transit in the real-world environment.

While engaging in the virtual environment 102 via the first avatar 114, the first user 110 may interact with a plurality of other users through a respective avatar. For example, the second user 112 may attempt to engage in an interaction session with the first avatar 114 through a second avatar 116 associated with the second user 112. In the real-world environment, the second user 112 may be physically located at a distance away from the first user 110. The second user 112 may access the virtual environment 102 through the second user device 106 to control the second avatar 116 and attempt to engage in an interaction session with the first user 110 through the first avatar 114.

Before the interaction between the first avatar 114 and second avatar 116 occurs, the virtual-world server 150 may authenticate that the first avatar 114 is associated with the first user 110 and not some unauthorized third-party. For example, the first user 110 may be required to sign into a secure portal that provides access to a data file (e.g., real-world data file 134 and/or virtual data file 170) associated with the first user 110. As shown in FIG. 1, the real-world data file 134 of the first user 110 is stored and managed by the real-world server 130 and the virtual data file 170 is stored and managed by the virtual-world server 150. In one or more embodiments, the virtual-world server 150 may employ single sign-on (SSO), multifactor authentication, or any other suitable authentication scheme in order to allow the first user 110 access to the virtual data file 170. The virtual data file 170 and the real-world data file 134 may include virtual data objects 172 and real-world data objects 136 respectively owned by the first user 110. The real-world server 130 and the virtual-world server 150 may store other information related to the first user 110 including, but not limited to, user profile information, account information (e.g., including identity and other details relating to the respective data files 134 and 170), avatar information, digital assets (e.g., respective real-world data objects 136 and virtual data objects 172) information, or any other suitable type of information that is associated with a user within the virtual environment 102 and/or the real-world environment.

Each of the real-world server 130 and the virtual-world server 150 is generally a suitable server (e.g., including a physical server and/or virtual server) operable to store data in a memory and/or provide access to application(s) or other services. One or both of the real-world server 130 and the virtual-world server 150 may be a backend server associated with a particular entity (e.g., organization) that facilitates conducting interactions between entities and one or more users. In other embodiments, one or both of the real-world server 130 and the virtual-world server 150 may be organized in a distributed manner, or by leveraging cloud computing technologies. Real-world server 130 may store information which is primarily used to support data interactions performed in the real-world environment. Virtual-world server 150 may store information which is primarily used to support data interactions performed in the virtual environment 102 (e.g., a metaverse environment). It may be noted that the operations performed by the real-world server 130 and the virtual-world server 150 described in embodiments of the present disclosure may be implemented by a single server.

The communication network 180 may facilitate communication within the system 100. This disclosure contemplates the communication network 180 being any suitable network operable to facilitate communication between the first user device 104, second user device 106, third user device 108, fourth user device 109, real-world server 130 and the virtual-world server 150. Communication network 180 may include any interconnecting system capable of transmitting audio, video, signals, data, messages, or any combination of the preceding. Communication network 180 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104, second user device 106, third user device 108, and fourth user device 109) may be any computing device configured to communicate with other devices, such as a server (e.g., real-world server 130 and/or virtual-world server 150), databases, etc. through the communication network 180. Each of the user devices may be configured to perform specific functions described herein and interact with one or both of real-world server 130 and the virtual-world server 150, e.g., via its user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to one or both of real-world server 130 and the virtual-world server 150, or to another user device.

Example User Device

Figure 2:
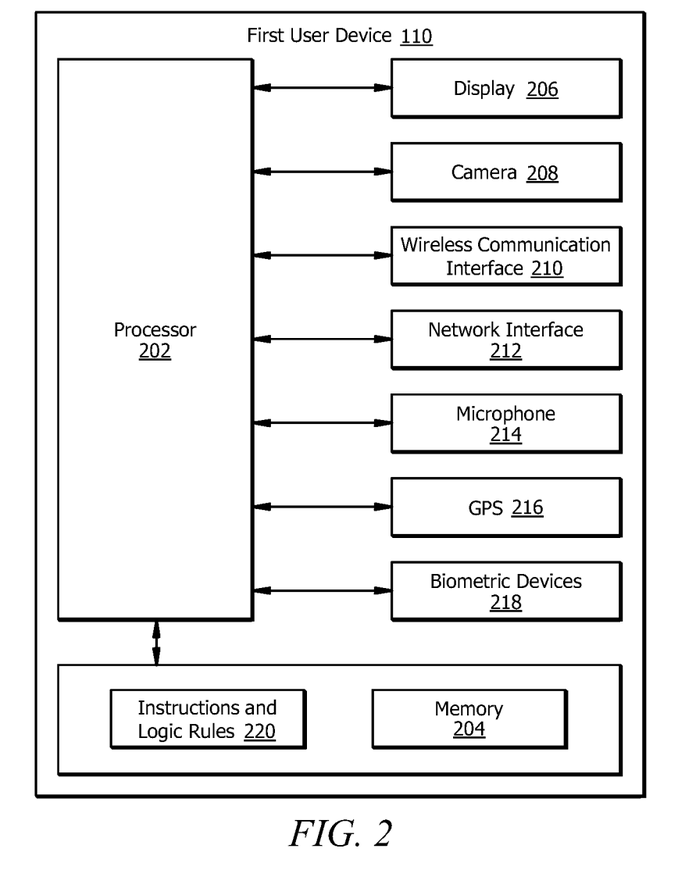
FIG. 2 is a block diagram of an embodiment of the first user device used by the system of FIG. 1.

FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1).

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the real-world server 130 and/or virtual-world server 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with the real-world server 130, virtual-world server 150, second user device 106, third user device 108 and/or fourth user device 109. In some embodiments, the function described herein is implemented using logic units, FPGAs, ASICs, DSPs, or any other suitable hardware or electronic circuitry.

Figure 3:
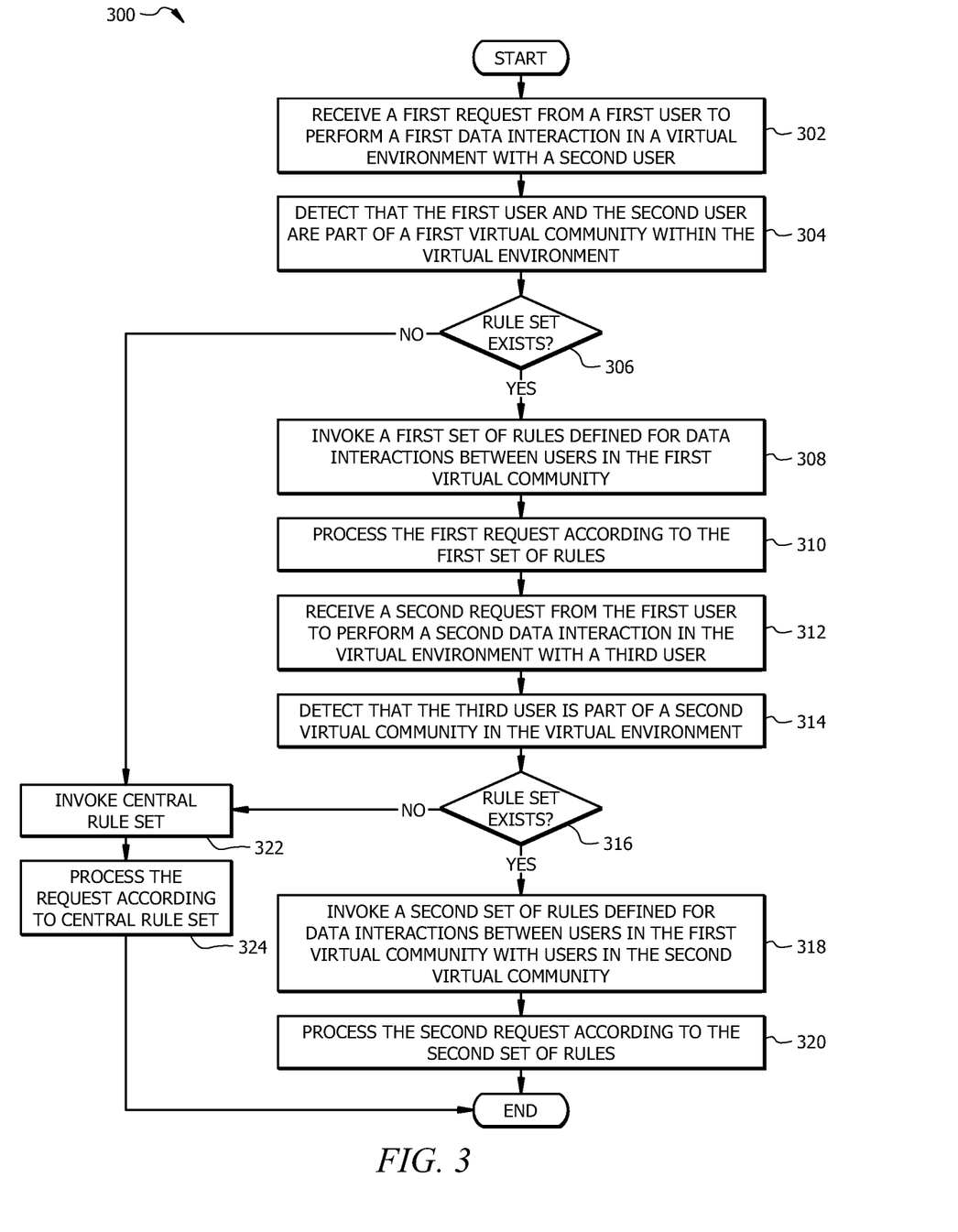
FIG. 3 illustrates a flowchart of an example method for performing data interactions within a virtual environment, in accordance with one or more embodiments of the present disclosure.

The memory 204 is operable to store any of the information described with respect to FIGS. 1 and 3 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user data 132), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106, third user device 108, fourth user device 109, the real-world server 130 and/or virtual-world server 150 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain (s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, in one or more embodiments, one or both of the real-world server 130 and the virtual-world server 150, and one or more user devices (e.g., second user device 106) may be part of an Information Technology (IT) infrastructure of an entity or organization. The real-world server 130 may be configured to allow users (e.g., first user 110) registered with the real-world server 130 to perform one or more data interactions in the real-world environment. Similarly, virtual-world server 150 may be configured to allow users (e.g., first user 110) registered with the virtual-world server 150 to perform one or more data interactions in the virtual environment 102 (e.g., a metaverse environment). In one embodiment, the real-world server 130 and the virtual-world server 150 are owned and/or operated by the same entity/organization. In this context, virtual-world server 150 may be configured to allow users (e.g., first user 110) registered with the real-world server 130 to perform one or more data interactions in the virtual environment 102 (e.g., a metaverse environment). In alternative embodiments, the real-world server 130 and the virtual-world server 150 may be owned and/or operated by different entities/organizations.

In one or more embodiments, as the first user 110 initially registers with the real-world server 130 in the real-world environment, the real-world server 130 may collect several pieces of information from the user including information relating to the identity of the user such as legal name, social security number, biometrics (e.g., fingerprints, retina scans, face ID etc.), residence address, phone numbers, assets owned by the user, and copies of government issued documents (e.g., identity card etc.). This information is stored by real-world server 130 as part of user data 132 of the first user 110. In one embodiment, at least a portion of the user data 132 relating to the first user 110 collected in the real-world environment may be stored in the virtual-world server 150. Once the identity of the first user 110 is confirmed and all other information provided by the first user 110 is verified to be correct, the real-world server 130 may generate a real-world data file 134 for the first user 110 in which the first user 110 may store real-world data objects 136 owned by the first user 110. In one example, the first user 110 may engage in a real-world interaction with a service representative managing the real-world server 130 (e.g., physical interaction at an office location, over phone, voice chat etc.) to provide such information that can be used to register the first user 110 at the real-world server 130 and generate the real-world data file 134 of the first user 110. In another example, the first user 110 may engage in a real-world interaction by accessing a webpage provided and managed by the real-world server 130. Once the first user 110 initiates a registration process via the webpage, the real-world server 130 may walk the first user 110 through several steps in which the first user 110 may be asked to provide information necessary to verify the identity of the first user 110 and register the first user 110 with the real-world server 130.

Information relating to the real-world data file 134 of the first user 110 may be stored as part of the user data 132 of the first user 110. This information may include, but is not limited to, an identity of the real-world data file 134, amount of real-world data objects 136 stored in the real-world data file 134, a log of data interactions conducted in relation to the real-world data file 134 and any other information relating to the real-world data file 134.

Once registered with the real-world server 130, the real-world server 130 may allow the first user 110 to perform one or more data interactions in the real-world environment. For example, a real-world data interaction may include transferring one or more real-world data objects 136 from the real-world data file 134 of the first user 110 to a second real-world data file (not shown) of another user (e.g., second user 112). Another example data interaction may include receiving one or more real-world data objects 136 in the real-world data file 134 of the first user 110 from a second real-world data file of another user (e.g., second user 112). Another example data interaction may include requesting by the first user 110 transfer of real-world data objects from a data file of a second user to a user data file of a third user as part of satisfying an agreement between the first user 110 and the third user. Another example data interaction may include modifying at least a portion of the user data 132 (e.g., user credentials to access the real-world server, phone numbers, home address, email address, information relating to user assets etc.) stored at the real-world server 130. It may be noted that a data interaction in accordance with embodiments of the present disclosure refers to any interaction in the real-world environment and/or metaverse environment 102 that includes transfer of data between computing nodes (e.g., first user device 104, second user device 106, third user device 108, fourth user device 109, real-world server 130 and virtual-world server 150).

The first user 110 may additionally register with the virtual-world server 150 in a similar manner to the first user 110 registering with the real-world server 130 as described above. Once registered with the virtual-world server 150, the virtual-world server 150 may generate a virtual data file 170 for the first user 110 in which the first user 110 may store virtual data objects 172 owned by the first user 110. In one or more embodiments, the virtual data file 170 of the first user 110 is associated with the real-world data file 134 of the first user 110. For example, real-world data objects 136 may be converted to virtual data objects 172 and vice versa. It may be noted that there may not be a one-to-one conversion between the real-world data objects 136 and the virtual data objects 172. For example, one real-world data object 136 may be converted to a plurality of virtual data objects 172, wherein the conversion ratio may be dynamically changed by an administrator of one or both the real-world server 130 and the virtual-world server 150.

Once registered with the virtual-world server 150, the virtual-world server 150 may allow the first user 110 to perform one or more virtual data interactions. For example, a virtual data interaction may include transferring one or more virtual data objects 172 from the virtual data file 170 of the first user 110 to a second virtual data file (not shown) of another user (e.g., second user 112). Another example data interaction may include receiving one or more virtual data objects 172 in the virtual data file 170 of the first user 110 from a second virtual data file (not shown) of another user (e.g., second user 112). Another example data interaction may include requesting by the first user 110 transfer of virtual data objects from a virtual data file of a second user (e.g., second user 112) to a virtual data file of a third user (e.g., third user 122) as part of satisfying an agreement between the first user 110 and the third user.

In one or more embodiments, a virtual data file (e.g. virtual data file 170) is a software application running on a computing node owned and/or operated by the respective user. For example, when the first user 110 desires to receive virtual data objects 172 from another virtual data file of a second user, first user 110 may direct the second user to a unique cryptographic address (e.g., public key) issued by the virtual data file 170. In one embodiment, the virtual data file 170 may not itself store the virtual data objects 172 but may store information that points to a location of the virtual data objects 172, for example, on a server (e.g., virtual-world server 150). Virtual data file 170 may be web-based or hardware-based. For example, virtual data file 170 may be stored in a mobile device or a desktop computer connected to the internet. Additionally or alternatively, virtual data file 170 may be stored in a device (e.g., USB drive) that is not connected to the network 180.

Data security is important in any system that supports online data interactions between computing nodes of the system. Online data interactions in real-world environments have existed for several decades and robust measures are already in place to ensure data security in real-world systems. However, virtual-world technology (e.g., metaverse technology) is relatively new and data security is a challenge in virtual environments as the development of virtual-world related technologies is still at a nascent stage and standardized systems that provide robust data security are not yet in place.

Embodiments of the present disclosure describe techniques for intelligently controlling data interactions between users in a virtual environment 102 based on rules defined for conducting data interactions between users of the virtual environment 102. As further described below, one or more rules may be defined in relation to data interactions performed between two users in the virtual environment 102 based on a level of confidence between the two users. For example, a set of rules defined for data interactions between two friends may be relatively relaxed in terms of data security as compared to a set of rules defined for data interactions between two strangers. The idea is that familiarity between users generally translates into a higher confidence level between the users and there is less likelihood of users engaging in deceptive interaction practices with other familiar users.

Virtual-world server 150 may allow a user (e.g., first user 110) to create one or more virtual communities 152, wherein each virtual community 152 includes a group of users that are registered to perform data interactions in the virtual environment 102. For example, a first virtual community 154 may include a first group of users and a second virtual community 156 may include a second group of users different from the first group of users. It may be noted that a user may be part of multiple virtual communities. For example, first user 110 may be part of the first virtual community 154 as well as the second virtual community 156. A virtual community 152 may include a group of users who are either familiar to each other in some manner and/or have confidence that members of the virtual community may not engage in deceptive interaction practices with other members of the virtual community. For example, a virtual community 152 may include users who are part of an immediate family, part of extended family, are friends, neighbors, part of a spiritual group, same neighborhood, same town, same school, same college, same workplace, or are part of any other group or community. In one embodiment, a member of a community may be a user who was recommended or referred by another member of the virtual community. As mentioned above, familiarity between users generally translates into a higher confidence level between the users and there is less likelihood of users engaging in deceptive interaction practices with other familiar users. Thus, it may be generally assumed that members of a virtual community are trustworthy and may not engage in deceptive data interaction practices with at least other members of the same virtual community 152. Information relating to the plurality of virtual communities 152 may be stored at the virtual-world server 150. This information may include, but is not limited to, identities of the community members, data interaction histories of the community members, information relating to virtual data files 170 and virtual data objects 172 associated with the community member. It may be noted that the terms "user" and "member" are used interchangeably in the context of a virtual community 152.

A user (e.g. first user 110) may define one or more sets of rules for data interactions performed in the virtual environment 102 between two members of a virtual community 152, between members of two different virtual communities 152, between a member of a virtual community 152 and another user who is not part of a virtual community 152, and between users who are part of no virtual communities 152. The sets of rules defined for data interactions in the virtual environment 102 between users may be stored by the virtual-world server 150 as rule sets 160. For example, first rule set 162 may include one or more rules that relate to data interactions performed between members of the first virtual community 152. Second rule set 164 may include one or more rules that relate to data interactions performed between a member of the first virtual community 154 and a member of the second virtual community 156. Central rule set 166 may include one or more rules that are used for data interactions performed between two users when no other rule set 160 is defined for data interactions between the two users.

Rules defined in a rule set 160 may include, but are not limited to, one or more of types of data interactions allowed to be performed, a maximum amount of data objects that can be sent and/or received, users who can or cannot engage in data interactions with each other, entities with whom a user can or cannot perform a data interaction, threshold amounts associated with transfer of data objects (sent or received) that trigger additional verification and/or approval, specific types of data interactions not allowed to be performed, avatar configurations that can be used by a user, limits on sharing user data, and one or more users devices that can or cannot be used to perform data interactions.

In one or more embodiments, rules defined for data interactions between members of a virtual community 152 may be less stringent and may implement lesser safeguards. On the other hand, rules defined for data interactions between members of different virtual communities 152 may be more stringent and may implement a higher level of safeguards. For example, a rule set 160 defined for data interactions between members of the same virtual community 152 may not require additional verification or approvals for data interactions performed between the members of the virtual community 152. However, a rule set 160 defined for data interactions between members of two different virtual communities 152 may require additional verification (e.g., explicit confirmation of a data interaction by the user) for data interactions associated with transfer of virtual data objects that equal or exceed a threshold amount of virtual data objects. When no rule set 160 is defined for data interactions between two users (e.g., between strangers), the central rule set 166 may be used that implements the most stringent level of safeguards to avoid scams including theft of data objects (e.g., virtual data objects 172). Essentially, rules may be defined for a rule set 160 based on a confidence level between users to which those rules apply. Rules implementing less stringent safeguards may be defined for data interactions between users having a higher confidence level between them and rules implementing more stringent safeguards may be defined for data interactions between users having a lower level of confidence or no confidence between them. For example, a rule set 160 defined for virtual data interactions between family members or neighbors may have lesser safeguards as compared to another rule set 160 defined for virtual data interactions between users living in the same town but are not part of the same family or neighborhood.

It may be noted that a rule set 160 may define a common set of rules that apply to data interactions performed between any two members of a virtual community 152. Additionally or alternatively, a different rule set 160 may be defined for data interaction between different users of the same virtual community 152. For example, a first rule set may be defined for data interactions between two members of a virtual community 152 when at least one of the members is a minor. A second rule set may be defined for data interactions between two adult members of the same virtual community 152. For example, the first rule set may define a lower threshold for the maximum amount data objects that can be transferred (e.g., sent or received) as part of a data interaction when a minor user is involved. Additionally or alternatively, a rule set 160 may define one or more rules for a data interaction between a user (e.g., member of a virtual community 152) and an entity or organization.

An example embodiment will now be described for controlling virtual data interactions between users based on rules sets 160. First rule set 162 may include one or more rules that relate to data interactions performed between members of the first virtual community 152. Second rule set 164 may include one or more rules that relate to data interactions performed between a member of the first virtual community 154 and a member of the second virtual community 156. Central rule set 166 may include one or more rules that are used for data interactions performed between two users when no other rule set 160 is defined for data interactions between the two users. Virtual-world server 150 may be configured to manage data interactions performed in the virtual environment between users based on the rule sets 160. Each rule set 160 may include or may be associated with information/metadata relating to which community or communities the rule set 160 relates to. When the virtual-world server 150 receives a request to perform a virtual data interaction from a user (e.g., first user 110), the virtual-world server 150, based on the request, determines which one of the rule sets 160 applies to the requested data interaction. In one embodiment, the virtual-world server 150 may examine the information/metadata associated with the rule sets 160 to determine which one of the rule sets 160 applies to the requested data interaction. For example, when the requesting user is part of the first virtual community 154 and is requesting to perform a virtual data interaction with another user of the first virtual community 154, virtual-world server 150 may choose the first rule set 162 and process the request based on the first rule set 162. In a second example, when the requesting user is part of the first virtual community 154 and is requesting to perform a virtual data interaction with a user of the second virtual community 156, virtual-world server 150 may choose the second rule set 164 and process the request based on the second rule set 164. In one embodiment, when the virtual-world server 150 determines that no rule set 160 is defined specifically for the requested data interaction, virtual-world server 150 selects the central rule set 166 and processes the requested data interaction based on the central rule set 166.

In one or more embodiments, rule sets 160 may be implemented using smart contract technology, wherein a rule set 160 is a smart contract including one or more rules or conditions relating to one or more virtual data interactions performed between two users. A smart contract is a software application or a piece of software code that represents an agreement between two users (e.g., users 110 and 112). A data interaction (e.g., transfer of virtual data objects between virtual data files) is generally processed when the conditions/rules in the smart contract are met. Smart contracts allow users of the virtual environment to securely engage in complex data interactions without a trusted third party needing to administer these data interactions. Thus, in the context of this disclosure, the terms "rule set" and "smart contract" may be used interchangeably. For example, the first rule set 162 may be a first smart contract, the second rule set 164 may be a second smart contract and the central rule set 166 may be a central smart contract.

Virtual-world server 150 may be configured to allow users (e.g., first user 110) to create customized rule sets 160 (or smart contracts) and associate the created rule sets 160 with one or more virtual communities 152. Once a rule set 160 is associated with one or more virtual communities 152, virtual-world server 150 may regulate virtual data interactions between members of the one or more virtual communities based on the associated rule set 160. In one or more embodiments, virtual-world server 150 may store one or more template smart contracts 168, wherein each template smart contract may include a standard set of rules for managing data interactions in the virtual environment. When the virtual-world server 150 provides multiple template smart contracts 168, different template smart contracts 168 may include different sets of rules. One or more template smart contracts 168 may include the same one or more rules. The standard rules included in a template smart contract 168 may include, but are not limited to, one or more of types of data interactions allowed to be performed, a maximum amount of data objects that can be sent and/or received, users who can or cannot engage in data interactions with each other, entities with whom a user can or cannot perform a data interaction, threshold amounts associated with transfer of data objects (sent or received) that trigger additional verification and/or approval, specific types of data interactions not allowed to be performed, avatar configurations that can be used by a user, limits on sharing user data, and one or more users devices that can or cannot be used to perform data interactions.

A user (e.g., an administrator of a virtual community 152) may select a template smart contract 168 provided by the virtual-world server 150 that best suits performing secure virtual data interactions by one or more users of a virtual community 152 and may request the virtual-world server to associate the selected template smart contract 168 with the virtual community 152. Upon receiving the request, virtual-world server 150 may associate the selected template smart contract 168 with the selected virtual community, which may include creating metadata that specifies that one or more data interactions within the selected virtual community 152 are to be managed based on the rules of the selected template smart contract 168 and storing the selected template smart contract 168 along with the associated metadata. Once the selected template smart contract 168 has been associated with the selected virtual community 152, virtual-world server 150 may manage any subsequent virtual data interactions between members of the virtual community 152 based on one or more rules of the associated template smart contract 168.

In one or more embodiments, a template smart contract 168 may be configurable by one or more of adding one or more rules to the standard set of rules of the template smart contract 168, deleting one or more rules from the standard set of rules of the template smart contract 168 and modifying one or more standard set of rules of the template smart contract 168. In this context, virtual-world server 150 may allow users to configure a template smart contract 168 to suit their needs. For example, a user may select a template smart contract 168 and configure the selected template smart contract 168 by modifying the standard set of rules included in the template smart contract 168. To configure a selected template smart contract, the user may request the virtual-world server to modify the standard set of rules included in the template smart contract 168 including at least one of adding one or more rules to the standard set of rules of the template smart contract 168, deleting one or more rules from the standard set of rules of the template smart contract 168 and modifying one or more standard set of rules of the template smart contract 168. In response to receiving the request, virtual-world server 150 may configure the selected template smart contract 168 by modifying the standard set of rules as specified by the user. The virtual-world server 150 may then associate the configured template smart contract to a virtual community upon request by the user.

In some cases, when two users engage in a virtual data interaction, different rule sets 160 may apply to virtual data interactions performed by the two users. For example, when the first user 110 who is part of the first virtual community 154 engages in a virtual data interaction with the second user 112 who is part of the second virtual community 156, different rules sets 160 may be associated with the first virtual community 154 and the second virtual community 156 that define rules relating to virtual data interactions performed by respective members with users outside their virtual communities. In such cases, virtual-world server 150 may be configured to compare the different rule sets 160 and determine a common set of rules that can apply to the data interaction between the first user 110 and the second user 112. In one embodiment, when two rules conflict between the two rule sets, virtual-world server selects the rule that has a higher data security standard. For example, when a rule of a first rule set places a lower threshold of data objects for triggering additional verification as compared to a corresponding rule of the second rule set, virtual-world server 150 selects the rule from the first rule set that places the lower threshold as it implements a higher data security standard. In another example, when a rule of a first rule set requires data interactions with a minor user to require additional verification as compared to a corresponding rule of the second rule set that does not require additional verification for data interactions with a minor user, virtual-world server 150 selects the rule from the first rule set that requires additional verification as it implements a higher data security standard. Rules that do not conflict are added to the common set of rules. Virtual-world server may process the data interaction between the first user 110 and the second user 112 based on the common set of rules generated after the above negotiation between the first and second sets of rules.

In some embodiments, when a first user engages with a second user in a virtual data interaction, a first rule set 162 may apply to the first user and the central rule set 166 may apply to the second user. In such cases, the rules of the central rule set 166 may take precedence as the rules of the central rule set 166 may enforce the highest level of data security. In some cases, one or more rules in the first rule set 162 that do not conflict with the rules of the central rule set 166 may be included in the central rule set 166 to generate a modified central rule set. Virtual-world server 150 may then use the modified central rule set to manage the virtual data interaction between the first user and the second user.

In one or more embodiments, a rule set 160 may include one or more rules for conversion between virtual data objects 172 and real-world data objects 136. As described above, the virtual data file 170 of the first user 110 is associated with the real-world data file 134 of the first user 110 and that real-world data objects 136 may be converted to virtual data objects 172 and vice versa. There may not be a one-to-one conversion between the real-world data objects 136 and the virtual data objects 172. For example, one real-world data object 136 may be converted to a plurality of virtual data objects 172, wherein the conversion ratio may be dynamically changed by an administrator of one or both the real-world server 130 and the virtual-world server 150. A rule set 160 may include the conversion ratio for converting virtual data objects 172 to real-world data objects 136 and vice-versa. Virtual-world server 150, upon request from a user, may convert a requested amount of virtual data objects 172 from the virtual data file 170 of the user to real-world data objects 136 based on the conversion ratio included in a rule set 160. The converted real-world data objects 136 may be stored in the real-world data file 134 of the user.

In an example banking use case, the system and methods disclosed in accordance with embodiments of the present disclosure may provide significant safeguards to users performing virtual banking transactions in a virtual environment 102. In this context, the real-world server 130 may be owned and/or operated by a bank. The virtual-world server 150 may be operated by the same bank or may be operated by another entity. The real-world data file 134 may correspond to a real-world bank account of the first user 110 and the real-world data objects 136 may correspond to the real-world funds in the bank account of the first user 110. User data 132 may include information relating to the bank account of the first user and other information relating to transactions performed by the first user 110 in relation to the bank account. The virtual data file 170 may correspond to a digital wallet of the first user in the virtual environment and the virtual data objects may correspond to digital currency owned by the user. Thus, a transfer of virtual data objects 172 may correspond to a transfer of digital currency. In this context, the system and methods disclosed in embodiments of the present disclosure allow for digital transactions (e.g., involving transfer of digital currency) between users in the virtual environment 102 to be managed based on rule sets 160.

FIG. 3 illustrates a flowchart of an example method 300 for performing data interactions within a virtual environment, in accordance with one or more embodiments of the present disclosure. Method 300 may be performed by the virtual-world server 150 shown in FIG. 1.

At operation 302, virtual-world server 150 receives a first request from a first user 110 to perform a first data interaction in a virtual environment 102 with a second user 112. As described above, once registered with the virtual-world server 150, the virtual-world server 150 may allow the first user 110 to perform one or more virtual data interactions. For example, a virtual data interaction may include transferring one or more virtual data objects 172 from the virtual data file 170 of the first user 110 to a second virtual data file (not shown) of another user (e.g., second user 112). Another example data interaction may include receiving one or more virtual data objects 172 in the virtual data file 170 of the first user 110 from a second virtual data file (not shown) of another user (e.g., second user 112).

At operation 304, virtual-world server 150 detects that the first user 110 and the second user 112 are part of a first virtual community 154 within the virtual environment.

As described above, virtual-world server 150 may allow a user (e.g., first user 110) to create one or more virtual communities 152, wherein each virtual community 152 includes a group of users that are registered to perform data interactions in the virtual environment 102. For example, a first virtual community 154 may include a first group of users and a second virtual community 156 may include a second group of users different from the first group of users. It may be noted that a user may be part of multiple virtual communities. For example, first user 110 may be part of the first virtual community 154 as well as the second virtual community 156. A virtual community 152 may include a group of users who are either familiar to each other in some manner and/or have confidence that members of the virtual community may not engage in deceptive interaction practices with other members of the virtual community. For example, a virtual community 152 may include users who are part of an immediate family, part of extended family, are friends, neighbors, part of a spiritual group, same neighborhood, same town, same school, same college, same workplace, or are part of any other group or community. In one embodiment, a member of a community may be a user who was recommended or referred by another member of the virtual community.

At operation 306, virtual-world server 150 determines whether a rule set 160 exists for data interactions performed between users of the first virtual community. When a rule set 160 does not exist for data interactions performed between users of the first virtual community 154, method 300 proceeds to operation 322 where virtual-world server 150 invokes the central rule set 166 and processes the first request based on the central rule set. On the other hand, in response to detecting that a first rule set 162 exists that defines a first set of rules for data interactions performed between users of the first virtual community 154, method 300 proceeds to operation 308 where virtual-world server 150 invokes the first rule set 162.

At operation 310, virtual-world server 150 processes the first request to perform the first data interaction in the virtual environment 102 with a second user, based on the first set of rules of the first rule set 162.

At operation 312, virtual-world server 150 receives a second request from the first user 110 to perform a second data interaction in the virtual environment 102 with a third user 122.

At operation 314, virtual-world server 150 detects that the third user 122 is part of a second virtual community 156 in the virtual environment 102, wherein the second virtual community 156 is different from the first virtual community 154.

At operation 316, virtual-world server 150 determines whether a rule set 160 exists for data interactions performed between users in the first virtual community with users in the second virtual community 156. When a rule set 160 does not exist for data interactions performed between users in the first virtual community 154 and users in the second virtual community 156, method 300 proceeds to operation 322 where virtual-world server 150 invokes the central rule set 166 and processes the second request based on the central rule set. On the other hand, in response to detecting that a second rule set 164 exists that defines a second set of rules for data interactions performed between users in the first virtual community 154 and users in the second virtual community 156, method 300 proceeds to operation 318 where virtual-world server 150 invokes the second rule set 164.

At operation 320, virtual-world server 150 processes the second request to perform a second data interaction in the virtual environment 102 with a third user 122, based on the second set of rules in the second rule set 164.

As described above, a user (e.g. first user 110) may define one or more sets of rules for data interactions performed in the virtual environment 102 between two members of a virtual community 152, between members of two different virtual communities 152, between a member of a virtual community 152 and another user who is not part of a virtual community 152, and between users who are part of no virtual communities 152. The sets of rules defined for data interactions in the virtual environment 102 between users may be stored by the virtual-world server 150 as rule sets 160. For example, first rule set 162 may include one or more rules that relate to data interactions performed between members of the first virtual community 152. Second rule set 164 may include one or more rules that relate to data interactions performed between a member of the first virtual community 154 and a member of the second virtual community 156. Central rule set 166 may include one or more rules that are used for data interactions performed between two users when no other rule set 160 is defined for data interactions between the two users.

Rules defined in a rule set 160 may include, but are not limited to, one or more of types of data interactions allowed to be performed, a maximum amount of data objects that can be sent and/or received, users who can or cannot engage in data interactions with each other, entities with whom a user can or cannot perform a data interaction, threshold amounts associated with transfer of data objects (sent or received) that trigger additional verification and/or approval, specific types of data interactions not allowed to be performed, avatar configurations that can be used by a user, limits on sharing user data, and one or more users devices that can or cannot be used to perform data interactions.

In one or more embodiments, rules defined for data interactions between members of a virtual community 152 may be less stringent and may implement lesser safeguards. On the other hand, rules defined for data interactions between members of different virtual communities 152 may be more stringent and may implement a higher level of safeguards. For example, a rule set 160 defined for data interactions between members of the same virtual community 152 may not require additional verification or approvals for data interactions performed between the members of the virtual community 152. However, a rule set 160 defined for data interactions between members of two different virtual communities 152 may require additional verification (e.g., explicit confirmation of a data interaction by the user) for data interactions associated with transfer of virtual data objects that equal or exceed a threshold amount of virtual data objects. When no rule set 160 is defined for data interactions between two users (e.g., between strangers), the central rule set 166 may be used that implements the most stringent level of safeguards to avoid scams including theft of data objects (e.g., virtual data objects 172). Essentially, rules may be defined for a rule set 160 based on a confidence level between users to which those rules apply. Rules implementing less stringent safeguards may be defined for data interactions between users having a higher confidence level between them and rules implementing more stringent safeguards may be defined for data interactions between users having a lower level of confidence or no confidence between them. For example, a rule set 160 defined for virtual data interactions between family members or neighbors may have lesser safeguards as compared to another rule set 160 defined for virtual data interactions between users living in the same town but are not part of the same family or neighborhood.

Virtual-world server 150 may be configured to manage data interactions performed in the virtual environment between users based on the rule sets 160. Each rule set 160 may include or may be associated with information/metadata relating to which community or communities the rule set 160 relates to. When the virtual-world server 150 receives a request to perform a virtual data interaction from a user (e.g., first user 110), the virtual-world server 150, based on the request, determines which one of the rule sets 160 applies to the requested data interaction. In one embodiment, the virtual-world server 150 may examine the information/metadata associated with the rule sets 160 to determine which one of the rule sets 160 applies to the requested data interaction. For example, when the requesting user is part of the first virtual community 154 and is requesting to perform a virtual data interaction with another user of the first virtual community 154, virtual-world server 150 may choose the first rule set 162 and process the request based on the first rule set 162. In a second example, when the requesting user is part of the first virtual community 154 and is requesting to perform a virtual data interaction with a user of the second virtual community 156, virtual-world server 150 may choose the second rule set 164 and process the request based on the second rule set 164. In one embodiment, when the virtual-world server 150 determines that no rule set 160 is defined specifically for the requested data interaction, virtual-world server 150 selects the central rule set 166 and processes the requested data interaction based on the central rule set 166.

In one embodiment, virtual-world server 150 receives a third request from the first user 110 to perform a third data interaction in the virtual environment 102 with a fourth user 124. The virtual-world server detects that no rule set 160 is defined for data interactions between the first user 110 and the fourth user 124. In response to detecting that rule set 160 is defined for data interactions between the first user 110 and the fourth user 124, virtual-world server 150 invokes a central rules set 166 defined for data interactions between users of the virtual environment 102 and processes the third request according to the central rule set 166.

Figure 4:
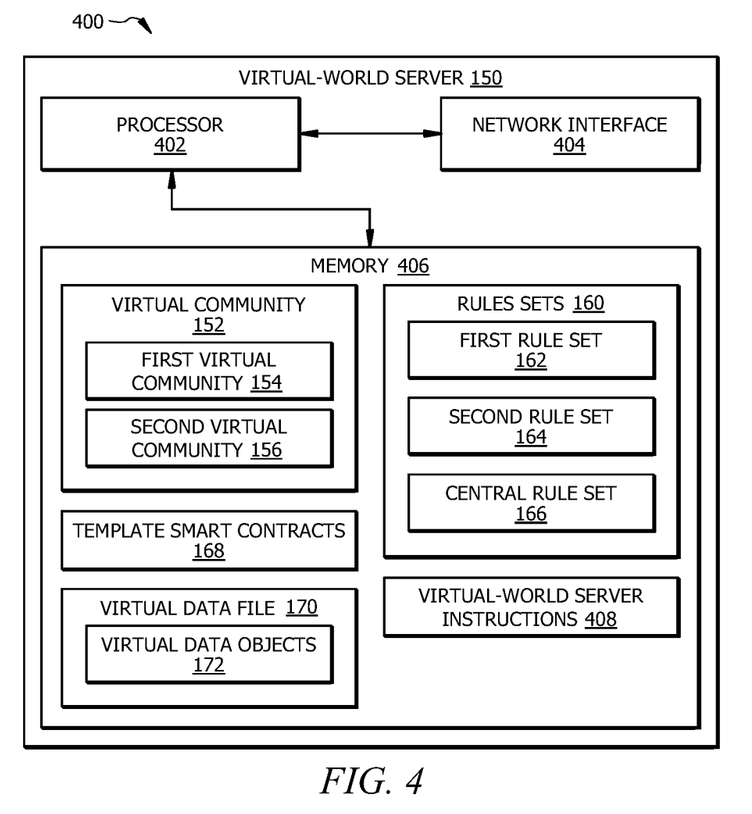
FIG. 4 illustrates an example schematic diagram of the virtual-world server shown in FIG. 1, in accordance with one or more aspects of the present disclosure.

FIG. 4 illustrates an example schematic diagram 400 of the virtual-world server 150 shown in FIG. 1, in accordance with one or more aspects of the present disclosure.

The virtual-world server 150 comprises a processor 402, a memory 406, and a network interface 404. The virtual-world server 150 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., virtual-world server instructions 408) to implement the virtual-world server 150. In this way, processor 402 may be a special-purpose computer designed to implement the functions disclosed herein. In one or more embodiments, the virtual-world server 150 is implemented using logic units, FPGAs, ASICs, DSPs, or any other suitable hardware. The virtual-world server 150 is configured to operate as described with reference to FIG. 3. For example, the processor 402 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store information relating to virtual communities 152 including first virtual community 154 and second virtual community 156, rule sets 160 including first rule set 162, second rule set 164 and central rule set 166, virtual data file 170, virtual data objects 172, template smart contracts 168 and the virtual-world server instructions 408. The virtual-world server instructions 408 may include any suitable set of instructions, logic, rules, or code operable to execute the virtual-world server 150.

The network interface 404 is configured to enable wired and/or wireless communications. The network interface 404 is configured to communicate data between the virtual-world server 150 and other devices, systems, or domains (e.g. user devices 104 and 106 and the real-world server 130). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

Figure 5:
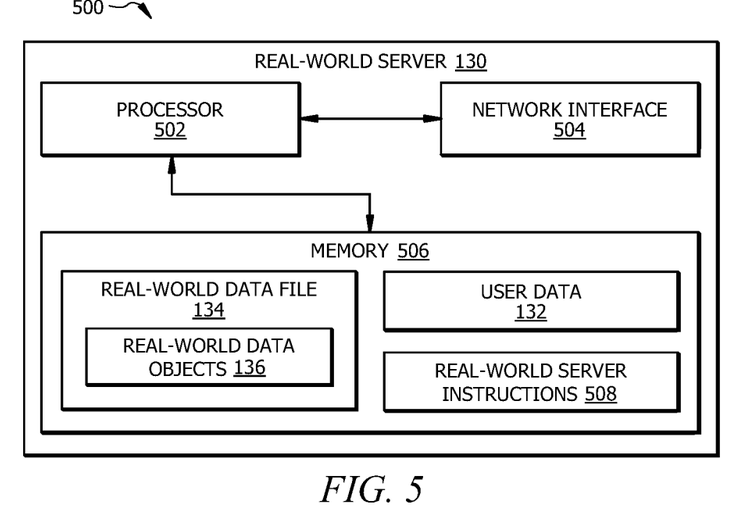
FIG. 5 illustrates an example schematic diagram of the real-world server 130 shown in FIG. 1, in accordance with one or more aspects of the present disclosure.

FIG. 5 illustrates an example schematic diagram 500 of the real-world server 130 shown in FIG. 1, in accordance with one or more aspects of the present disclosure.

The real-world server 130 comprises a processor 502, a memory 506, and a network interface 504. The real-world server 130 may be configured as shown in FIG. 5 or in any other suitable configuration.

The processor 502 comprises one or more processors operably coupled to the memory 506. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs).

The processor 502 may be a programmable logic device, a microcontroller, a microprocessor, or any suitable combination of the preceding. The processor 502 is communicatively coupled to and in signal communication with the memory 506. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., real-world server instructions 508) to implement the real-world server 130. In this way, processor 502 may be a special-purpose computer designed to implement the functions disclosed herein. In one or more embodiments, the real-world server 130 is implemented using logic units, FPGAs, ASICs, DSPs, or any other suitable hardware. The real-world server 130 is configured to operate as described with reference to FIGS. 1 and 3. For example, the processor 502 may be configured to perform at least a portion of the method 300 as described in FIG. 3.

The memory 506 comprises one or more disks, tape drives, or solid-state drives, and may be used as an over-flow data storage device, to store programs when such programs are selected for execution, and to store instructions and data that are read during program execution. The memory 506 may be volatile or non-volatile and may comprise a read-only memory (ROM), random-access memory (RAM), ternary content-addressable memory (TCAM), dynamic random-access memory (DRAM), and static random-access memory (SRAM).

The memory 506 is operable to store information relating to user data 136, real-world data file 134, real-world data objects 136 and the real-world server instructions 508. The real-world server instructions 508 may include any suitable set of instructions, logic, rules, or code operable to execute the real-world server 130.

The network interface 504 is configured to enable wired and/or wireless communications. The network interface 504 is configured to communicate data between the real-world server 130 and other devices, systems, or domains (e.g. user devices 104 and 106 and the virtual-world server 150). For example, the network interface 504 may comprise a Wi-Fi interface, a LAN interface, a WAN interface, a modem, a switch, or a router. The processor 502 is configured to send and receive data using the network interface 504. The network interface 504 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
 a user device that can be used by a first user to enter a virtual environment and perform data interactions in the virtual environment;
 a memory storing a first set of rules and a second set of rules; and
 at least one processor coupled to the user device and the memory, and configured to:
  receive a first request from the first user to perform a first data interaction with a second user comprising transfer of data objects between a first data file associated with the first user and a second data file associated with the second user, wherein the first data interaction is to be performed in the virtual environment;
  detect that the first user and the second user are part of a first virtual community within the virtual environment;
  in response to the detecting, invoke a first smart contract that implements the first set of rules defined for data interactions between users in the first virtual community, wherein the first smart contract implements at least a portion of the first set of rules defining data transfer between users that are part of the first virtual community;
  process the transfer of the data objects associated with the first request according to the first set of rules, wherein processing the first request comprises implementing the first smart contract to enforce one or more rules from the first set of rules that define data transfer between users that are part of the first virtual community;
  receive a second request from the first user to perform a second data interaction with a third user comprising transfer of data objects between the first data file associated with the first user and a third data file associated with the third user, wherein the second data interaction is to be performed in the virtual environment;
  detect that the third user is part of a second virtual community in the virtual environment, wherein the second virtual community is different from the first virtual community;
  in response to detecting that the third user is part of the second virtual community, invoke a second smart contract that implements the second set of rules defined for data interactions between users in the first virtual community with users in the second virtual community, wherein the second smart contract implements at least a portion of the second set of rules defining data transfer between users that are part of the first virtual community and users that are part of the second virtual community; and process the transfer of the data objects associated with the second request according to the second set of rules, wherein processing the second request comprises implementing the second smart contract to enforce one or more rules from the second set of rules that define data transfer between users that are part of the first virtual community and users that are part of the second virtual community.

2. The system of claim 1, wherein the first set of rules enforce a lower level of data security as compared the second set of rules.

3. The system of claim 1, wherein the at least one processor is further configured to:
provide a plurality of template smart contracts, wherein:
each template smart contract includes a standard set of rules for managing data interactions in the virtual environment; and
each template smart contract includes a different standard set of rules.

4. The system of claim 3, wherein the at least one processor is further configured to:
receive a selection of a template smart contract from the plurality of template smart contracts;
receive a selection of a virtual community to be associated with the selected template smart contract; and
process one or more data interactions in the virtual environment between users in the selected virtual community based on the standard set of rules in the selected template smart contract.

5. The system of claim 3, wherein:
at least one of the template smart contracts is a configurable smart contract that is configurable by one or more of adding one or more rules to the standard set of rules of the at least one template smart contract, deleting one or more rules from the standard set of rules of the at least one template smart contract and modifying one or more standard set of rules of the at least one template smart contract:
the at least one processor is further configured to:
receive a selection of the configurable smart contract;
receive a request to configure the configurable smart contract by one or more of adding one or more rules to the standard set of rules of the at least one template smart contract, deleting one or more rules from the standard set of rules of the at least one template smart contract or modifying one or more standard set of rules of the at least one template smart contract;
configuring the configurable smart contract based on the received request;
receive a selection of a virtual community to be associated with the configurable smart contract; and
process one or more data interactions in the virtual environment between users in the selected virtual community based on the configured set of rules in the configurable smart contract.

6. The system of claim 1, wherein the at least one processor is further configured to:
receive a third request from the first user to perform a third data interaction in the virtual environment with a fourth user;
detect that no set of rules are defined for data interactions between the first user and the fourth user;
in response to detecting that no set of rules are defined for data interactions between the first user and the fourth user, invoke a central set of rules defined for data interactions between users of the virtual environment; and
process the third request according to the central set of rules.

7. The system of claim 6, wherein the at least one processor is further configured to:
add one or more rules from the first set of rules to the central set of rules to generate a modified central set of rules; and
process the third request according to the modified central set of rules.

8. The system of claim 6, wherein the central set of rules enforces a highest level of data security as compared to all other sets of rules defined for data interactions in the virtual environment.

9. The system of claim 1, wherein the at least one processor is further configured to:
convert one or more virtual data objects associated with the first data interaction to corresponding one or more real-world data objects.

10. A method for performing data interactions in a virtual environment, comprising:
receiving a first request from a first user to perform a first data interaction with a second user comprising transfer of data objects between a first data file associated with the first user and a second data file associated with the second user, wherein the first data interaction is to be performed in a virtual environment;
detecting that the first user and the second user are part of a first virtual community within the virtual environment;
in response to the detecting, invoking a first smart contract that implements a first set of rules defined for data interactions between users in the first virtual community, wherein the first smart contract implements at least a portion of the first set of rules defining data transfer between users that are part of the first virtual community;
processing the transfer of the data objects associated with the first request according to the first set of rules, wherein processing the first request comprises implementing the first smart contract to enforce one or more rules from the first set of rules that define data transfer between users that are part of the first virtual community;
receiving a second request from the first user to perform a second data interaction with a third user comprising transfer of data objects between the first data file associated with the first user and a third data file associated with the third user, wherein the second data interaction is to be performed in the virtual environment;
detecting that the third user is part of a second virtual community in the virtual environment, wherein the second virtual community is different from the first virtual community;
in response to detecting that the third user is part of the second virtual community, invoking a second smart contract that implements a second set of rules defined for data interactions between users in the first virtual community with users in the second virtual community, wherein the second smart contract implements at least a portion of the second set of rules defining data transfer between users that are part of the first virtual community and users that are part of the second virtual community; and processing the transfer of the data objects associated with the second request according to the second set of rules, wherein processing the second request comprises implementing the second smart contract to enforce one or more rules from the second set of rules that define data transfer between users that are part of the first virtual community and users that are part of the second virtual community.

11. The method of claim 10, wherein the first set of rules enforce a lower level of data security as compared the second set of rules.

12. The method of claim 10, further comprising:
providing a plurality of template smart contracts, wherein:
each template smart contract includes a standard set of rules for managing data interactions in the virtual environment; and
each template smart contract includes a different standard set of rules.

13. The method of claim 12, further comprising:
receiving a selection of a template smart contract from the plurality of template smart contracts;
receiving a selection of a virtual community to be associated with the selected template smart contract; and
processing one or more data interactions in the virtual environment between users in the selected virtual community based on the standard set of rules in the selected template smart contract.

14. An apparatus comprising:
a memory storing a first set of rules and a second set of rules; and
at least one processor coupled to the memory, and configured to:
receive a first request from a first user to perform a first data interaction with a second user comprising transfer of data objects between a first data file associated with the first user and a second data file associated with the second user, wherein the first data interaction is to be performed in a virtual environment;
detect that the first user and the second user are part of a first virtual community within the virtual environment;
in response to the detecting, invoke a first smart contract that implements the first set of rules defined for data interactions between users in the first virtual community, wherein the first smart contract implements at least a portion of the first set of rules defining data transfer between users that are part of the first virtual community;
process the transfer of the data objects associated with the first request according to the first set of rules, wherein processing the first request comprises implementing the first smart contract to enforce one or more rules from the first set of rules that define data transfer between users that are part of the first virtual community;
receive a second request from the first user to perform a second data interaction with a third user comprising transfer of data objects between the first data file associated with the first user and a third data file associated with the third user, wherein the second data interaction is to be performed in the virtual environment;
detect that the third user is part of a second virtual community in the virtual environment, wherein the second virtual community is different from the first virtual community;
in response to detecting that the third user is part of the second virtual community, invoke a second smart contract that implements the second set of rules defined for data interactions between users in the first virtual community with users in the second virtual community, wherein the second smart contract implements at least a portion of the second set of rules defining data transfer between users that are part of the first virtual community and users that are part of the second virtual community; and
process the transfer of the data objects associated with the second request according to the second set of rules, wherein processing the second request comprises implementing the second smart contract to enforce one or more rules from the second set of rules that define data transfer between users that are part of the first virtual community and users that are part of the second virtual community.

15. The apparatus of claim 14, wherein the first set of rules enforce a lower level of data security as compared the second set of rules.

16. The apparatus of claim 14, wherein the at least one processor is further configured to:
provide a plurality of template smart contracts, wherein:
each template smart contract includes a standard set of rules for managing data interactions in the virtual environment; and
each template smart contract includes a different standard set of rules.

17. The apparatus of claim 16, wherein the at least one processor is further configured to:
receive a selection of a template smart contract from the plurality of template smart contracts;
receive a selection of a virtual community to be associated with the selected template smart contract; and
process one or more data interactions in the virtual environment between users in the selected virtual community based on the standard set of rules in the selected template smart contract.

* * * * *